United States Patent
Li et al.

(10) Patent No.: US 12,182,906 B2
(45) Date of Patent: Dec. 31, 2024

(54) DYNAMIC FLUID DISPLAY METHOD AND APPARATUS, ELECTRONIC DEVICE, AND READABLE MEDIUM

(71) Applicant: Beijing Zitiao Network Technology Co., Ltd., Beijing (CN)

(72) Inventors: Qi Li, Beijing (CN); Xiaoqi Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/340,400

(22) Filed: Jun. 23, 2023

(65) Prior Publication Data

US 2023/0334730 A1 Oct. 19, 2023

Related U.S. Application Data

(63) Continuation-in-part of application No. PCT/CN2021/133136, filed on Nov. 25, 2021, and a
(Continued)

(30) Foreign Application Priority Data

Dec. 25, 2020 (CN) .......................... 202011562654.5
Dec. 25, 2020 (CN) .......................... 202011565590.4

(51) Int. Cl.
*G06T 11/00* (2006.01)
*G06F 3/0488* (2022.01)
(Continued)

(52) U.S. Cl.
CPC .......... *G06T 11/001* (2013.01); *G06F 3/0488* (2013.01); *G06T 7/20* (2013.01);
(Continued)

(58) Field of Classification Search
CPC . G06T 11/001; G06T 7/70; G06T 7/20; G06T 2200/24; G06T 2207/10016; G06T 2210/24; G06F 3/0488; G06F 3/017
(Continued)

(56) References Cited

U.S. PATENT DOCUMENTS

| 2008/0166022 A1* | 7/2008 | Hildreth | ................. G06T 7/254 382/107 |
| 2010/0301995 A1* | 12/2010 | Nguyen | ................. G06F 21/32 340/5.2 |

(Continued)

FOREIGN PATENT DOCUMENTS

| CN | 102496177 A | 6/2012 |
| CN | 103679802 A | 3/2014 |

(Continued)

OTHER PUBLICATIONS

International Search Report issued Feb. 11, 2022, in International (PCT) Application No. PCT/CN2021/133137, with English translation (5 pages).

(Continued)

*Primary Examiner* — Tom V Sheng
(74) *Attorney, Agent, or Firm* — Astute IP Law Group

(57) ABSTRACT

Provided are a dynamic fluid display method and apparatus, an electronic device, and a readable medium. The method includes: detecting a target object on a user display interface; obtaining attribute information of the target object; determining, on the user display interface based on the attribute information of the target object, a change of a parameter of a fluid at each target texture pixel associated with the target object; and displaying a dynamic fluid on the user display interface based on the change of the parameter of the fluid.

18 Claims, 5 Drawing Sheets

Related U.S. Application Data continuation-in-part of application No. PCT/CN2021/133137, filed on Nov. 25, 2021.

(51) Int. Cl.
  *G06T 7/20* (2017.01)
  *G06T 7/70* (2017.01)
  *G06F 3/01* (2006.01)

(52) U.S. Cl.
  CPC .............. *G06T 7/70* (2017.01); *G06F 3/017* (2013.01); *G06T 2200/24* (2013.01); *G06T 2207/10016* (2013.01); *G06T 2210/24* (2013.01)

(58) Field of Classification Search
  USPC ......................................................... 345/173
  See application file for complete search history.

(56) References Cited

U.S. PATENT DOCUMENTS

| | | | | |
|---|---|---|---|---|
| 2011/0231797 A1* | 9/2011 | Huhtala | ................ | G06F 1/1694 715/811 |
| 2012/0191432 A1* | 7/2012 | Khataniar | ............... | E21B 43/14 703/10 |
| 2013/0120386 A1* | 5/2013 | Wilensky | ................ | G06T 13/60 345/173 |
| 2013/0132053 A1* | 5/2013 | Mech | .................... | G06T 11/001 703/9 |
| 2018/0067622 A1* | 3/2018 | Chaudhri | ............ | G06F 3/04817 |
| 2018/0150296 A1 | 5/2018 | Son et al. | | |
| 2023/0298265 A1* | 9/2023 | Li | ........................... | G06T 7/579 382/154 |
| 2023/0368422 A1* | 11/2023 | Li | ............................ | G06T 7/75 |
| 2023/0401764 A1* | 12/2023 | Wang | .................... | G06T 11/001 |

FOREIGN PATENT DOCUMENTS

| | | |
|---|---|---|
| CN | 104781779 A | 7/2015 |
| CN | 105303598 A | 2/2016 |
| CN | 110322540 A | 10/2019 |
| CN | 110930487 A | 3/2020 |
| CN | 113114841 A | 7/2021 |
| WO | 2017042985 A | 3/2017 |

OTHER PUBLICATIONS

International Search Report issued Jan. 27, 2022, in International (PCT) Application No. PCT/CN2021/133136, with English translation (5 pages).

* cited by examiner

DYNAMIC FLUID DISPLAY METHOD AND APPARATUS, ELECTRONIC DEVICE, AND READABLE MEDIUM

CROSS-REFERENCE TO RELATED APPLICATIONS

The present application is a continuation-in-part of International Application PCT/CN2021/133137 filed on Nov. 25, 2021, which claims a priority to Chinese Patent Application No. 202011562654.5, titled "DYNAMIC FLUID DISPLAY METHOD AND APPARATUS, ELECTRONIC DEVICE, AND READABLE MEDIUM", and filed on Dec. 25, 2020. The present application is also a continuation-in-part of International Application PCT/CN2021/133136 filed on Nov. 25, 2021, which claims a priority to Chinese Patent Application No. 202011565590.4, titled "DYNAMIC FLUID DISPLAY METHOD AND APPARATUS, ELECTRONIC DEVICE, AND READABLE MEDIUM", and filed on Dec. 25, 2020. The entire contents of the above-referenced patent applications are incorporated herein by reference.

FIELD

The present disclosure relates to the field of computer technologies, and more particularly, to a dynamic fluid display method and apparatus, an electronic device, and a readable medium.

BACKGROUND

Various applications based on terminal devices have been widely used with the rapid development of computer technology and communication technology, greatly enriching people's daily lives. Users can use various applications to entertain themselves, share their daily lives with other users, etc. In order to enhance the fun, an interaction method is usually added to game applications or video shooting applications to improve user experience.

However, in the related art, the interaction method applied to the mobile terminals is neither diversified nor interesting.

SUMMARY

The present disclosure provides a dynamic fluid display method and apparatus, an electronic device, and a readable medium.

In a first aspect, a dynamic fluid display method is provided. The method includes: detecting a target object on a user display interface; obtaining attribute information of the target object; determining, on the user display interface based on the attribute information of the target object, a change of a parameter of a fluid at each target texture pixel associated with the target object; and displaying a dynamic fluid on the user display interface based on the change of the parameter of the fluid.

In a second aspect, the present disclosure provides an electronic device. The electronic device includes: one or more processors; a memory having one or more applications stored thereon. The one or more applications, when executed by the one or more processors, cause the electronic device to perform operations corresponding to the dynamic fluid display method as described in the first aspect of the present disclosure.

In a third aspect, the present disclosure provides a computer-readable medium configured to store computer instructions. The computer instructions, when executed by a computer, cause the computer to perform the dynamic fluid display method as described in the first aspect of the present disclosure.

BRIEF DESCRIPTION OF THE DRAWINGS

In order to clearly explain technical solutions of embodiments of the present disclosure, accompanying drawings used in description of the embodiments of the present disclosure will be briefly described below.

DETAILED DESCRIPTION

Figure 1:
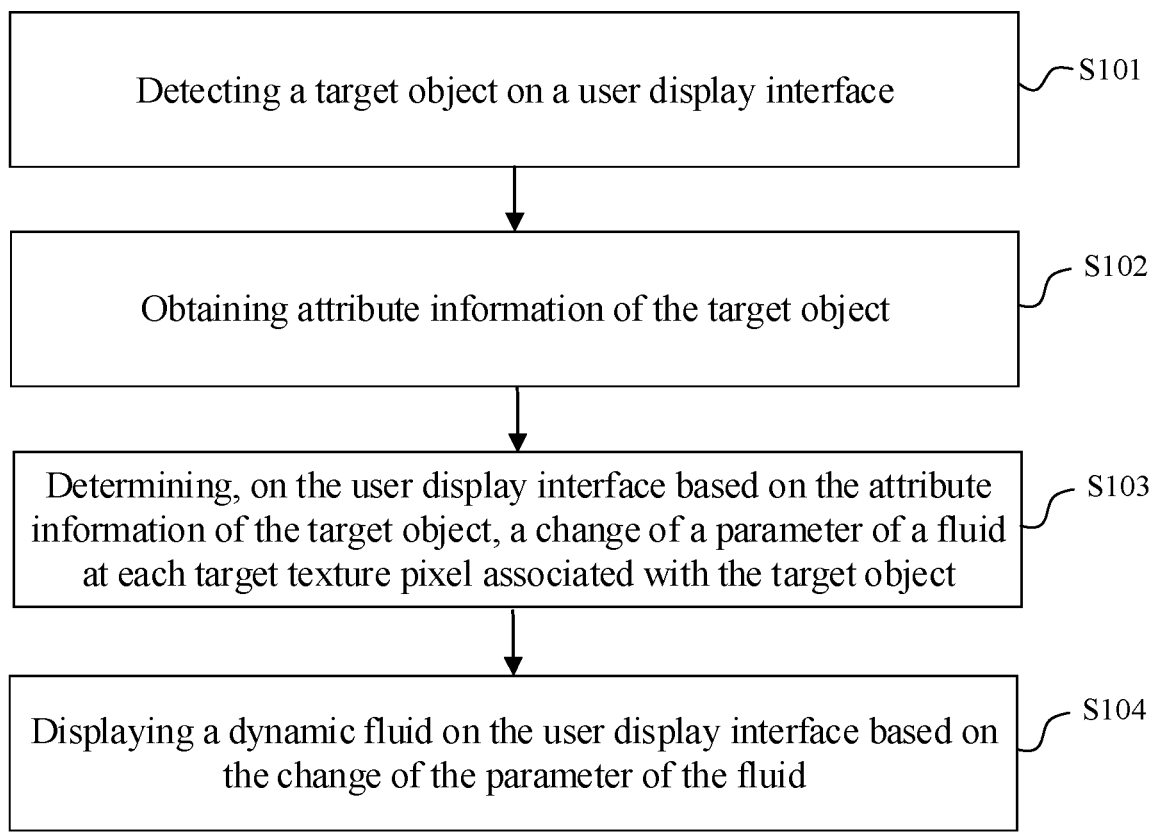
FIG. 1 is a flowchart illustrating a dynamic fluid display method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method implementations of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units, and are neither used to limit that these apparatuses, modules or units are definitely different apparatuses, modules or units, nor used to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, and are not intended to limit the scope of these messages or information.

The technical solutions of the present disclosure and how the technical solutions of the present disclosure solve the above technical problems will be described in detail below with specific embodiments. The following several specific embodiments may be combined with each other, and the same or similar concepts or processes may not be repeated in some embodiments. The embodiments of the present disclosure will be described below with reference to the accompanying drawings.

The technical solutions of the present disclosure can be used in application programs involving creation, application, and use of dynamic fluid effects. The technical solutions of the present disclosure may be applied in a terminal device that may include a mobile terminal or a computer device. The mobile terminal may include, for example, a smartphone, a Personal Digital Assistant (PDA), a tablet computer, a wearable device having a display screen, etc. The computer device may include, for example, a desktop computer, a laptop computer, an all-in-one computer, a smart home device, etc.

The technical solutions of the present disclosure can be implemented by a Graphics Processing Unit (GPU) of the terminal device. A user display interface is pre-divided into a plurality of grid elements in a horizontal direction and a vertical direction. The horizontal direction corresponds to a width direction of the user display interface. The vertical direction corresponds to a height direction of the user display interface. Grid elements correspond to positions of texture pixels of the GPU in a one-to-one correspondence. In a two-dimensional plane, the texture pixels correspond to positions of screen display pixels of the terminal device in a one-to-one correspondence. A fluid is displayed on the user display interface. The texture pixel is configured to store a parameter of the fluid corresponding to each grid element, including an initial speed parameter, etc. A color of the fluid displayed on the user display interface may be at least one pre-configured color, or may be at least one color determined based on a selection instruction of a user.

FIG. 1 is a flowchart illustrating a dynamic fluid display method according to an embodiment of the present disclosure. As illustrated in FIG. 1, the method may include operations at block S101 to S104.

At block S101, a target object on a user display interface is detected.

The user display interface may be a display interface in an application. The solution provided by the embodiments of the present disclosure may be implemented as an application or a functional plug-in of an application. When the terminal device detects a launch instruction of a user for the application, the application is launched and the user display interface is displayed. Or, when the terminal device detects a trigger instruction of user for the functional plug-in of the application, the user display interface is displayed.

Optionally, when a video shooting instruction of user is detected, a video shooting interface is displayed. In this case, the user display interface is the video shooting interface, and the target object may be a specific object on the video shooting interface, including but not limited to: the face, the head, a gesture, a finger, etc. of a person or other living creatures. The target object may be in motion or stationary.

The gesture may include, but is not limited to, finger up, making a fist, making a hand heart, giving a thumb-up, etc.

The terminal device may launch a video capture apparatus (e.g., a camera) of the terminal device to capture a video. A duration of video capture may be a predetermined time length (and/or time period), or may be determined based on a start instruction and an end instruction of the video capture. The present disclosure is not limited in this regard. During the video capture, the terminal device detects the target object on the user display interface, i.e., in a video picture.

Optionally, the target object may further include a touch operation object. For example, the user touches a display screen of the terminal device with a finger and swipes on the display screen. When the terminal device detects a touch operation instruction, an object inputting the touch operation instruction is the touch operation object (in this case, the finger is the touch operation object, i.e., the target object).

At block S102, attribute information of the target object is obtained.

The attribute information of the target object is information that represents a specific attribute of the target object. The specific attribute may include information related to a speed and/or a position of the target object, or may be information related to a color or the like corresponding to the target object.

Optionally, the position of the target object may be a position of at least one grid element corresponding to the target object on the user display interface.

A specific implementation of obtaining the attribute information may differ depending on a type of the target object.

When the target object is the target object in the video, the terminal device may determine the position, speed, and other attribute information of the target object based on each frame of image of the video.

When the target object is the touch operation object, the terminal device may determine the position, speed, and other attribute information of the target object based on a position of a detected touch operation, a time, or the like.

The color corresponding to the target object may be a predetermined color, and also may be a color determined based on the selection instruction entered by the user.

In a possible implementation, the target object includes the target object in the video. The attribute information of the target object includes a speed variation of the target object. Obtaining the attribute information of the target object includes: obtaining a position of the target object in each frame of image of the video; determining a moving distance of the target object from one frame of image to a next frame of image based on the position of the target object in each frame of image of the video; obtaining a moving time of the target object from the one frame of image to the next frame of image; determining a moving speed of the target object at each time point based on the moving distance and the moving time; and determining a speed variation of the target object from a current time point to a next time point, based on the moving speed of the target object at each time point.

In practice, the target object may be the target object in the video, e.g., a gesture in the video. A position of the gesture in each frame of image of the video is obtained subsequent to a detection of the gesture in the video. A moving distance of the gesture in adjacent frames of image can be obtained based on the position of the gesture in each frame of image of the video. A moving time of the gesture in adjacent frames of image is obtained. A moving speed of the gesture is determined based on the moving distance and the moving time of the gesture. A speed variation of the gesture is determined based on the moving speed of the gesture at each time point.

In a possible implementation, the target object includes the touch operation object. The attribute information of the target object includes a speed variation of the target object. Obtaining the attribute information of the target object includes: detecting a swiping operation speed of the touch operation object on the user display interface at each time point; and determining a speed variation of the touch operation object from a current time point to a next time point based on the swiping operation speed.

In practice, the target object may be the touch operation object. For example, when the finger touches and swipes on a screen, the terminal device detects a position corresponding to a swiping operation at each time point, determines a moving distance from a current time point to a next time point based on a position corresponding to each time point, and determines a time interval from the current time point to the next time point. A swiping operation speed at each time point can be calculated based on the moving distance and the time interval. A speed variation of swiping of the finger can be obtained based on the swiping operation speed at each time point.

At block S103, a change of a parameter of a fluid at each target texture pixel associated with the target object is determined on the user display interface based on the attribute information of the target object.

The change of the parameter of the fluid at each target texture pixel associated with the target object can be determined on the user display interface based on a change of the position of, the speed of, and the color corresponding to the target object, to enable interaction between the user and the terminal device. The target texture pixel is a texture pixel on the user display interface and associated with the target object, i.e., a texture pixel corresponding to an action scope of the target object. The parameter of the fluid may include a speed parameter, a color parameter, etc.

In a possible implementation, the parameter of the fluid includes a speed parameter. The attribute information of the target object includes a speed variation of the target object. Determining, on the user display interface based on the attribute information of the target object, the change of the parameter of the fluid at each target texture pixel associated with the target object includes: determining a change of the speed parameter of the fluid at each target texture pixel based on the speed variation of the target object.

In practice, when the target object includes the target object in the video (e.g., the finger of the user), a position of the target object in each frame of image of the video is obtained subsequent to a detection of the target object in the video. A distance of the target object in adjacent frames of image is determined based on the position of the target object in each frame of image. A speed of the target object is determined based on the distance of the target object in the adjacent frames of image. The speed variation of the target object is determined based on the speed of the target object at each time point. When the target object includes the touch operation object, the terminal device detects a start position and an end position of the touch operation, determines an action distance of the touch operation based on the start position and the end position, determines an action time of the touch operation based on a start time point and an end time point of the touch operation, and determines the speed of the target object based on the action time and the action distance, to further determine the speed variation of the target object based on the speed of the target object at each time point.

The terminal device may adjust the speed parameter of the fluid at each target texture pixel based on the speed variation of the target object, in such a manner that the fluid changes in speed based on a change of the speed of the target object. The speed change of the fluid may include at least one of a change in a speed magnitude or a change in a speed direction.

In a possible implementation, the attribute information of the target object may further include initial position information of the target object and an action radius of the target object. Determining the change of the speed parameter of the fluid at each target texture pixel based on the speed variation of the target object includes: obtaining, for each target texture pixel, position information corresponding to the target texture pixel; and determining, for each target texture pixel, a speed of the fluid at the target texture pixel at a next time point, based on the speed variation of the target object, the initial position information of the target object, the action radius of the target object, the position information corresponding to the target texture pixel, and a speed of the fluid at the target texture pixel at a current time point.

In practice, the attribute information of the target object further includes the initial position information of the target object and the action radius of the target object. The initial position information of the target object is a position of the target object when the target object first appears on the user display interface, and may be a position of at least one grid element corresponding to the target object when the target object first appears on the user display interface. The action radius of the target object represents the action scope of the target object on the user display interface. The action radius may be pre-configured as specifically needed. With an increase of the action radius, the action scope of the target object on the user display interface becomes larger. The position of the target object on the user display interface corresponds to a position of each target texture pixel. A position of each corresponding target texture pixel may be determined based on the position of the target object. The speed of the fluid at the target texture pixel at the next time point is determined based on the speed variation of the target object, the initial position information of the target object, the action radius of the target object, the position information corresponding to the target texture pixel, and the speed of the fluid at the target texture pixel at the current time point.

In an example, the speed of the fluid at the target texture pixel may be updated in accordance with an equation (1):

$$V_x^{t+1} = V_x^t + \exp\left(\frac{\|x-p\|^2}{r^2}\right) * \Delta V \tag{1}$$

where $V_x^{t+1}$ represents a speed of the fluid at a target texture pixel x at a time point t+1, $v_x^t$ represents a speed of the fluid at the target texture pixel x at a time point t, x represents a grid element position corresponding to the target texture pixel, p represents an initial position of the target object, r represents the action radius of the target object, and $\Delta V$ represents the speed variation of the target object from the time point t to the time point t+1.

In a possible implementation, the parameter of the fluid includes a color parameter. The attribute information of the target object includes a color variation corresponding to the target object. Determining, on the user display interface based on the attribute information of the target object, the change of the parameter of the fluid at each target texture pixel associated with the target object includes: determining a change of the color parameter of the fluid at each target texture pixel based on the color variation of the target object.

In practice, the parameter of the fluid includes the color parameter. The attribute information of the target object includes the color variation corresponding to the target object. The color variation corresponding to the target object may be a difference between a color value of a color corresponding to the target object at the current time point and a color value of a color corresponding to the target object at a previous time point. The color value may be a color value in any color space, for example, values of R, G, and/or B channels of an RGB color space.

The color parameter of the fluid at each target texture pixel may be adjusted based on the color variation corresponding to the target object, in such a manner that the fluid changes in color based on a change of the color corresponding to the target object.

In a possible implementation, the attribute information of the target object further includes initial position information of the target object and an action radius of the target object. Determining the change of the color parameter of the fluid at each target texture pixel based on the color variation corresponding to the target object includes: obtaining, for each target texture pixel, position information corresponding to the target texture pixel; and determining, for each target texture pixel, a color of the fluid at the target texture pixel at a next time point, based on the color variation corresponding to the target object, the initial position information of the target object, the action radius of the target object, the position information corresponding to the target texture pixel, and a color of the fluid at the target texture pixel at a current time point.

In practice, the attribute information of the target object further includes the initial position information of the target object and the action radius of the target object. The initial position information of the target object is the position of the target object when the target object first appears on the user display interface, and may be the position of at least one grid element corresponding to the target object when the target object first appears on the user display interface. The action radius of the target object represents the action scope of the target object on the user display interface. The action radius may be pre-configured as specifically needed. With an increase of the action radius, the action scope of the target object on the user display interface becomes larger. The position of the target object on the user display interface corresponds to the position of each target texture pixel. The position of each target texture pixel may be determined based on the position of the target object. The color of the fluid at the target texture pixel at the next time point is determined based on the color variation corresponding to the target object, the initial position information of the target object, the action radius of the target object, the position information corresponding to the target texture pixel, and the color of the fluid at the target texture pixel at the current time point.

In an example, the color of the fluid at the target texture pixel may be updated in accordance with an equation (2):

$$q_x^{t+1} = q_x^t + \exp\left(\frac{\|x-p\|^2}{r^2}\right) * \Delta q \quad (2)$$

where $q_x^{t+1}$ represents a color of the fluid at the target texture pixel x at the time point t+1, $q_x^t$ represents a color of the fluid at the target texture pixel x at the time point t, x represents the grid element position corresponding to the target texture pixel, p represents the initial position of the target object, r represents the action radius, and $\Delta q$ represents the color variation of the target object from the time point t to the time point t+1.

Optionally, the color variation corresponding to the target object remains the same when the target object is in a single continuous movement.

For example, when the finger swipes on a screen of the terminal device, the color corresponding to the finger remains the same in a swiping process. For example, the finger corresponds to a predetermined color, which is added to a color of the fluid at a swiping position of the finger. The color of the fluid at the swiping position of the finger is changed based on a color variation before and after the predetermined color is added.

In a possible implementation, the attribute information includes a display position of the target object when the target object is stationary. The parameter of the fluid includes a color parameter. Determining, on the user display interface based on the attribute information of the target object, the change of the parameter of the fluid at each target texture pixel associated with the target object includes: determining, on the user display interface based on the display position, a position of each target texture pixel associated with the target object, and adjusting a color of the fluid at each target texture pixel to a predetermined color.

In practice, when the target object is stationary, the attribute information of the target object includes the display position of the target object. The display position of the target object may be the position of the at least one grid element corresponding to the target object on the user display interface, i.e., a position of a grid element corresponding to at least one corresponding target texture pixel. The terminal device adjusts the color of the fluid at each target texture pixel to the predetermined color corresponding to the target object.

In an example, when the terminal device detects in the video that the target object is a stationary "hand heart" gesture corresponding to the predetermined color of red, the terminal device displays, on the user display interface, a red "hand heart" gesture at a position of the fluid corresponding to the target object. In this case, since the target object is stationary and has no impact on the speed parameter of the fluid, the fluid is displayed on the user display interface based on an initial speed parameter.

In a possible implementation, when at least two target objects are provided, the attribute information of the target object includes respective attribute information of each target object of the at least two target objects. Determining, on the user display interface based on the attribute information of the target object, the change of the parameter of the fluid at each target texture pixel associated with the target object includes: determining, on the user display interface based on the respective attribute information of each target object of the at least two target objects, a change of the parameter of the fluid at each target texture pixel associated with each target object, to display on the user display interface a dynamic fluid corresponding to each target object.

In practice, interaction of a plurality of target objects may be performed on the user display interface. Each target object adjusts the change of the parameter of the fluid at its corresponding target texture pixel based on its corresponding attribute information.

In determining the respective attribute information of the plurality of target objects, the plurality of target objects may be target objects in the video. In this case, for each target object of the plurality of target objects, when a position of the target object in adjacent frames of image of the video remains the same or the position of the target object in the adjacent frames of image of the video changes within a predetermined range, the target object is determined to be a same target object, thereby determining attribution of attribute information of the target object. The plurality of target objects may also be touch operation objects. In this case, for each target object of the plurality of target objects, whether the target object is the same target object is determined based on a touch operation position of the target object, thereby determining the attribution of the attribute information of the target object.

In an example, the video is assumed to include three gestures: "making a fist", "making a hand heart", and "giving a thump-up". Speed variations corresponding to "making a fist", "making a hand heart", and "giving a thump-up" are $\Delta v_1$, $\Delta v_2$, and $\Delta v_3$, respectively. Color variations corresponding to "making a fist", "making a hand heart", and "giving a thump-up" are $\Delta q_1$, $\Delta q_2$, and $\Delta q_3$, respectively. On the user display interface, a change of the speed parameter of the fluid at the target texture pixel associated with "making a fist" is determined based on $\Delta v_1$, and a change of the color parameter of the fluid at the target texture pixel associated with "making a fist" is determined based on $\Delta q_1$; a change of the speed parameter of the fluid at the target texture pixel associated with "making a hand heart" is determined based on $\Delta v_2$, and a change of the color parameter of the fluid at the target texture pixel associated with "making a hand heart" is determined based on $\Delta q_2$; and a change of the speed parameter of the fluid at the target texture pixel associated with "giving a thump-up" is determined based on $\Delta v_3$, and a change of the color parameter of the fluid at the target texture pixel associated with "giving a thump-up" is determined based on $\Delta q_3$.

At block S104, a dynamic fluid is displayed on the user display interface based on the change of the parameter of the fluid.

Specifically, a fluid simulation rendering is displayed on the user display interface based on the speed change of the fluid or the color change of the fluid. A dynamic effect of the fluid may be displayed in a form of a video or a motion image.

In a possible implementation, the parameter of the fluid includes a speed parameter. The method further includes, for each target texture pixel: obtaining a time stepsize for updating the speed parameter; obtaining the speed parameter of the fluid at the target texture pixel at a current time point; determining a first texture pixel position at the current time point based on the time stepsize, the speed parameter of the fluid at the target texture pixel at the current time point, and a position of the target texture pixel at the current time point; and determining a color at the first texture pixel position at the current time point as a color of the fluid at the target texture pixel at a next time point.

In practice, the time stepsize for updating the speed parameter may be predetermined. The speed parameter of the fluid at each target texture pixel may be updated based on the time stepsize. The color of the fluid at each target texture pixel may be updated simultaneously as the speed parameter is updated.

In an example, the color of the fluid at each target texture pixel may be updated in accordance with an equation (3):

$$I_x^{t+1}=I_{x-dt*v_x^t}^t \qquad (3)$$

where x represents a position of a grid element corresponding to the target texture pixel; $I_x^{t+1}$ represents a color of the fluid at the position x at the time point t+1; dt represents the time stepsize; $v_x^t$ represents a speed parameter of the fluid at the position x at the time point t; $x-dt*v_x^t$ represents the first texture pixel position at the time point t; and $I_{x-dt*v_x^t}^t$ represents a color of the fluid at the first texture pixel position at the time point t.

In a possible implementation, the method further includes, for each target texture pixel, in response to detecting no target object in the user display interface: determining a second texture pixel position at the current time point based on the time stepsize, the speed parameter of the fluid at the target texture pixel at the current time point, and the position of the target texture pixel at the current time point; and determining a speed parameter of the fluid at the second texture pixel position at the current time point as a speed parameter of the fluid at the target texture pixel at the next time point.

In practice, when an initial state of the fluid is a stationary state, the parameter of the fluid at each target texture pixel in an image changes based on the attribute information of the target object subsequent to the detection of the target object, to enable the fluid to drive the image to start flowing. When the user stops an interaction action at a time point, i.e., no target object is detected in the user display interface, the fluid continues to flow in accordance with inertia at this time point. A specific processing method is: for each target texture pixel in the image, determining the second texture pixel position at the current time point based on the predetermined time stepsize for updating the speed, the speed parameter of the fluid at the target texture pixel at the current time point, and the position of the target texture pixel at the current time point; and determining the speed parameter of the fluid at the second texture pixel position at the current time point as the speed parameter of the fluid at the target texture pixel at the next time point, and updating the color of the fluid based on the speed parameter. The color of the fluid may be updated in accordance with the method shown in the equation (3), to enable the image to flow with the inertia of the fluid.

In an example, the speed of the fluid at each target texture pixel may be updated in accordance with an equation (4):

$$V_x^{t+1}=v_{x-dt*v_x^t}^t \qquad (4)$$

where x represents the position of the grid element corresponding to the target texture pixel; $V_x^{t+1}$ represents a speed parameter of the fluid at the position x at the time point t+1; dt represents the time stepsize; $v_x^t$ represents the speed parameter of the fluid at the position x at the time point t; $x-dt*v_x^t$ represents the second texture pixel position corresponding to the target texture pixel at the position x at the time point t; and $V_{x-dt*v_x^t}$ represents the speed parameter of the fluid at the second texture pixel position at the time point t.

In an example, a 1-st gesture produces a rightward speed for the fluid on the left and a 2-nd gesture produces a leftward speed for the fluid on the right, thus the fluids on both sides will move towards the middle, creating a collision effect. When no gesture is detected in a current picture, the fluid will continue to flow under the action of the inertia.

After the collision, for the fluid under the action of the inertia, the speed of the fluid at each target texture pixel is updated in accordance with the equation (4).

After the collision, for the fluid under the action of the inertia, the color of the fluid at each target texture pixel is updated in accordance with the equation (3).

Based on the above technical solution provided by the present disclosure, an explanation of the technical solution is provided below with a specific embodiment. The specific embodiment and its contents are intended only to illustrate a possible implementation of the technical solution of the present disclosure and do not represent all implementations of the technical solution of the present disclosure.

Figure 2:
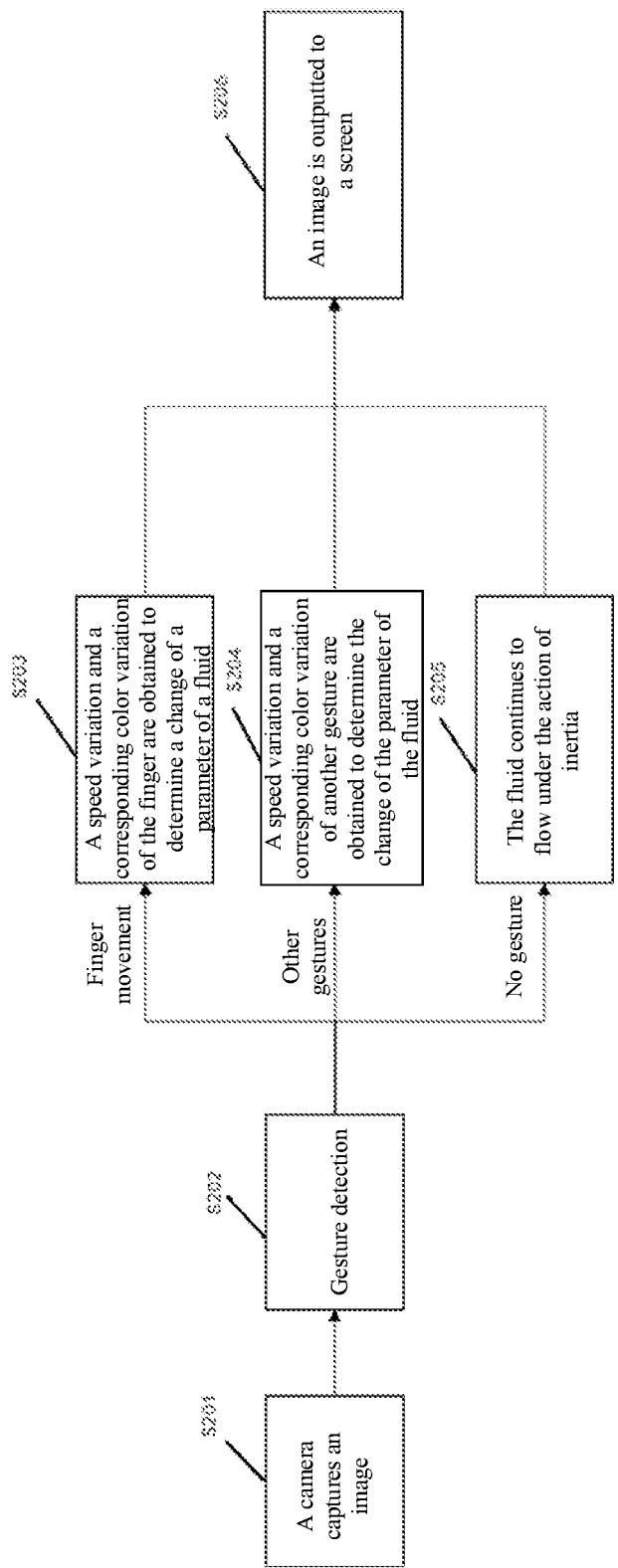
FIG. 2 is a flowchart illustrating an execution process of a dynamic fluid display method according to an embodiment of the present disclosure.

As illustrated in FIG. 2, the operation at block S201 is executed. Upon detecting a camera launch instruction on the user display interface, the terminal device launches the camera to capture a video ("a camera captures a picture" illustrated in the figure).

The operation at block S202 is executed: a gesture detection is performed on a video picture.

The operation at block S203 is executed: when a movement of a finger is detected, a speed variation and a corresponding color variation of the finger are obtained, and the change of the speed and the change of the color of the fluid at the target texture pixel corresponding to the finger are determined based on the speed variation and the color variation ("determine a change of a parameter of a fluid" illustrated in FIG. 2).

The operation at block S204 is executed: when a movement of another gesture in the video picture is detected, a speed variation and a corresponding color variation of the other gesture are obtained, and the change of the speed and the change of the color of the fluid at the target texture pixel corresponding to the finger are determined based on the speed variation and the color variation.

The operation at block S205 is executed: when no gesture is detected in the video picture, the terminal device may simulate a state in which the fluid continues to move under the action of the inertia (e.g., "the fluid continues to flow under the action of the inertia" illustrated in FIG. 2).

In each of the above operations, the movement of the finger, the movement of the other gesture, the movement of the fluid, and the change of the color are displayed on the user display interface. In the operation at block S206 illustrated in the figure, the terminal device outputs the image to the screen of the terminal device.

In the dynamic fluid display method provided in the embodiments of the present disclosure, the target object on the user display interface is detected. The attribute information of the target object is obtained. The change of the parameter of the fluid at each target texture pixel associated with the target object is determined on the user display interface based on the attribute information of the target object. The dynamic fluid is displayed on the user display interface based on the change of the parameter of the fluid. With the technical solution of the present disclosure, the change of the parameter of the fluid on the user display interface is controlled based on the attribute information of the target object detected on the user display interface, thereby displaying the dynamic fluid. Such an interaction method is a novel and interesting.

Figure 3:
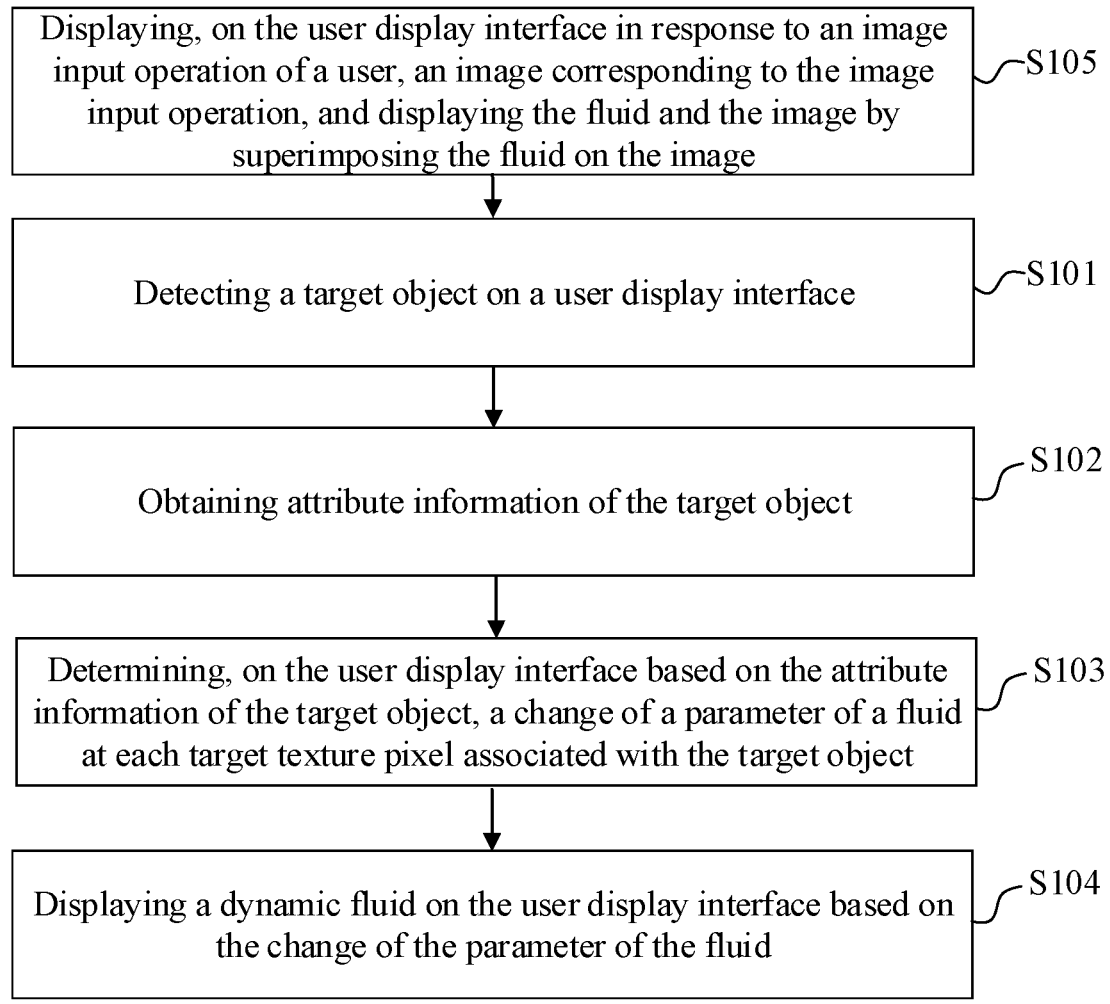
FIG. 3 is a flowchart illustrating another dynamic fluid display method according to an embodiment of the present disclosure.

FIG. 3 is a flowchart illustrating another dynamic fluid display method according to an embodiment of the present disclosure. In addition to the operations illustrated in FIG. 1, the method further includes the following operations.

At block S105, an image corresponding to the image input operation is displayed on the user display interface in response to an image input operation of a user, and the fluid and the image are displayed by superimposing the fluid on the image.

The terminal device may receive an image inputted by the user as a background image, and divide the background image into a plurality of grid elements in a horizontal direction and a vertical direction. The horizontal direction corresponds to a width direction of the image. The vertical direction corresponds to a height direction of the image. The grid elements correspond to the positions of the texture pixels of the GPU in a one-to-one correspondence. In the two-dimensional plane, the texture pixels correspond to the positions of the screen display pixels of the terminal device in a one-to-one correspondence. When the background image is displayed on the user display interface, the texture pixels correspond to pixels in the background image in a one-to-one correspondence. That is, the grid elements correspond to the pixels in the background image in a one-to-one correspondence. The fluid is displayed in the background image. The texture pixel is configured to store the parameter of the fluid corresponding to each grid element, including the initial speed parameter, etc.

The background image may be an image in any color, which may be a single color or a plurality of colors. The fluid may be a fluid in any color and may be in a stationary state or a moving state. The fluid and the image inputted by the user are displayed by superimposing the fluid on the image inputted by the user. Optionally, the color of the fluid is different from that of the background image. In this way, a better display effect is achieved when the fluid and the background image are displayed on the user display interface.

In an example, the fluid is colorless, transparent and in the stationary state, and the background image is a multi-colored image displaying a content of a landscape. When the fluid is displayed in the background image by superimposing the fluid on the background image, the background image with a layer of transparent fluid superimposed is displayed on the user display interface.

Correspondingly, the operation of determining, on the user display interface based on the attribute information of the target object, the change of the parameter of the fluid at each target texture pixel associated with the target object at block S103 includes: determining, in the image based on the attribute information, the change of the parameter of the fluid at each target texture pixel associated with the target object.

The change of the parameter of the fluid at each target texture pixel associated with the target object may be determined in the image based on the change in the position, the speed, and the like of the target object, thereby enabling an interaction between the user and the terminal device. The target texture pixel is a texture pixel in the image and associated with the target object, i.e., the texture pixel corresponding to the action scope of the target object. At least one target texture pixel may be provided. The parameter of the fluid may be a relevant parameter reflecting a movement state, a display state, or the like of the fluid.

The operation of displaying the dynamic fluid on the user display interface based on the change of the parameter of the fluid at block S104 includes: displaying the dynamic fluid in the image based on the change of the parameter of the fluid at each target texture pixel.

In some embodiments, the fluid simulation rendering is displayed on the image based on a change of the movement state, the display state, or other relevant parameters of the fluid, thereby presenting that the flow of fluid drives the background image to move together with the fluid. The dynamic effect of the fluid may be displayed in the form of a video or a motion image.

Optionally, the target object at block S101 and block S102 may be a specific object in the video, including but not limited to: the face, the head, a gesture, a finger, etc. of a person or other living creatures.

The gesture may include, but is not limited to, finger up, making a fist, making a hand heart, giving a thumb-up, etc.

In the dynamic fluid display method provided in the embodiments of the present disclosure, the background image inputted by the user may be received. The fluid and the background image may be displayed by superimposing the fluid on the background image. When the target object is detected on the user display interface, the change of the parameter of the fluid in the image is controlled based on the attribute information of the target object detected on the user display interface, to display the dynamic fluid, thereby realizing that the fluid drives the background image to move together with the fluid. Such an interaction method is novel and interesting.

Based on the same principle as that of the method illustrated in FIG. 1, the embodiments of the present disclosure further provide a dynamic fluid display apparatus 40. As illustrated in FIG. 3, the dynamic fluid display apparatus 40 may include a detection module 41, an obtaining module 42, a determining module 43, and a first display module 44.

The detection module 41 is configured to detect a target object on a user display interface. The obtaining module 42 is configured to obtain attribute information of the target object. The determining module 43 is configured to determine, on the user display interface based on the attribute information of the target object, a change of a parameter of a fluid at each target texture pixel associated with the target object. The first display module 44 is configured to display a dynamic fluid on the user display interface based on the change of the parameter of the fluid.

In a possible implementation, the parameter of the fluid includes a speed parameter. The attribute information of the target object includes a speed variation of the target object. The determining module 43 is configured to: determine a change of the speed parameter of the fluid at each target texture pixel based on the speed variation of the target object.

In a possible implementation, the attribute information of the target object further includes initial position information of the target object and an action radius of the target object. The determining module 43 is configured to, when determining the change of the speed parameter of the fluid at each target texture pixel based on the speed variation of the target object: obtain, for each target texture pixel, position information corresponding to the target texture pixel; and determine, for each target texture pixel, a speed of the fluid at the target texture pixel at a next time point, based on the speed variation of the target object, the initial position information of the target object, the action radius of the target object, the position information corresponding to the target texture pixel, and a speed of the fluid at the target texture pixel at a current time point.

In a possible implementation, the parameter of the fluid includes a color parameter. The attribute information of the target object includes a color variation corresponding to the target object. The determining module 43 is configured to: determine a change of the color parameter of the fluid at each target texture pixel based on the color variation corresponding to the target object.

In a possible implementation, the attribute information of the target object further includes initial position information of the target object and an action radius of the target object. The determining module 43 is configured to, when determining the change of the color parameter of the fluid at each target texture pixel based on the color variation corresponding to the target object: obtain, for each target texture pixel, position information corresponding to the target texture pixel; and determine, for each target texture pixel, a color of the fluid at the target texture pixel at a next time point, based on the color variation corresponding to the target object, the initial position information of the target object, the action radius of the target object, the position information corresponding to the target texture pixel, and a color of the fluid at the target texture pixel at a current time point.

In a possible implementation, the attribute information includes a display position of the target object when the target object is stationary. The parameter of the fluid includes a color parameter. The determining module 43 is configured to: determine, on the user display interface based on the display position, a position of each target texture pixel associated with the target object, and adjust a color of the fluid at each target texture pixel to a predetermined color.

In a possible implementation, when at least two target objects are provided, the attribute information includes respective attribute information of each target object of the at least two target objects. The determining module 43 is configured to: determine, on the user display interface based on the respective attribute information of each target object of the at least two target objects, a change of the parameter of the fluid at each target texture pixel associated with each target object, to display on the user display interface a dynamic fluid corresponding to each target object.

In a possible implementation, the parameter of the fluid includes a speed parameter. A dynamic fluid display apparatus 50 further includes a color update module. The color update module is configured to: obtain a time step size for updating the speed parameter; obtain, for each target texture pixel, the speed parameter of the fluid at the target texture pixel at a current time point; determine, for each target texture pixel, a first texture pixel position at the current time point based on the time stepsize, the speed parameter of the fluid at the target texture pixel at the current time point, and a position of the target texture pixel at the current time point; and determine a color at the first texture pixel position at the current time point as a color of the fluid at the target texture pixel at a next time point.

In a possible implementation, in response to detecting no target object in the user display interface, the dynamic fluid display apparatus 50 further includes a speed update module. The speed update module is configured to: determine, for each target texture pixel, a second texture pixel position at the current time point based on the time stepsize, the speed parameter of the fluid at the target texture pixel at the current time point, and the position of the target texture pixel at the current time point; and determine, for each target texture pixel, a speed parameter of the fluid at the second texture pixel position at the current time point as a speed parameter of the fluid at the target texture pixel at the next time point.

In a possible implementation, the target object includes a target object in a video or a touch operation object.

In a possible implementation, the target object is the target object in the video. The attribute information of the target object includes a speed variation of the target object. The obtaining module 42 is configured to: obtain a position of the target object in each frame of image of the video; determine a moving distance of the target object from one frame of image to a next frame of image based on the position of the target object in each frame of image of the video; obtain a moving time of the target object from the one frame of image to the next frame of image; determine a moving speed of the target object at each time point based on the moving distance and the moving time; and determine a speed variation of the target object from a current time point to a next time point, based on the moving speed of the target object at each time point.

In a possible implementation, the target object is the touch operation object. The attribute information of the target object includes a speed variation of the target object. The obtaining module 42 is configured to: detect a swiping operation speed of the touch operation object on the user display interface at each time point; and determine a speed variation of the touch operation object from a current time point to a next time point based on the swiping operation speed.

The dynamic fluid display apparatus of the embodiments of the present disclosure can perform the dynamic fluid display method provided in the embodiments of the present disclosure, principles of implementation of which are similar to those of the dynamic fluid display method. Actions performed by modules in the dynamic fluid display apparatus of the embodiments of the present disclosure correspond to the steps in the dynamic fluid display method of the embodiments of the present disclosure. A detailed function description of each module of the dynamic fluid display apparatus can be referred to corresponding description of the dynamic fluid display method described above, and details thereof will be omitted here.

According to the dynamic fluid display apparatus provided in the embodiments of the present disclosure, the target object on the user display interface is detected. The attribute information of the target object is obtained. The change of the parameter of the fluid at each target texture pixel associated with the target object is determined on the user display interface based on the attribute information of the target object. The dynamic fluid on the user display interface is displayed based on the change of the parameter of the fluid. With the technical solution of the present disclosure, the change of the parameter of the fluid on the user display interface is controlled based on the attribute information of the target object detected on the user display interface, thereby displaying the dynamic fluid. Such an interaction method is a novel and interesting.

Based on the same principle as that of the method illustrated in FIG. 3, the embodiments of the present disclosure further provide a dynamic fluid display apparatus 50. As illustrated in FIG. 5, in addition to the modules illustrated in FIG. 4, the dynamic fluid display apparatus 50 may further include a second display module 45. The second display module 45 is configured to: display, on the user display interface in response to an image input operation of a user, an image corresponding to the image input operation, and display the fluid and the image by superimposing the fluid on the image.

Correspondingly, the determining module 43 is configured to: determine, in the image based on the attribute information, the change of the parameter of the fluid at each target texture pixel associated with the target object.

The first display module 44 is configured to: display the dynamic fluid in the image based on the change of the parameter of the fluid at each target texture pixel.

The dynamic fluid display apparatus of the embodiments of the present disclosure can perform the dynamic fluid display method provided in the embodiments of the present disclosure, principles of implementation of which are similar to those of the dynamic fluid display method. Actions performed by modules in the dynamic fluid display apparatus of the embodiments of the present disclosure correspond to the steps in the dynamic fluid display method of the embodiments of the present disclosure. A detailed function description of each module of the dynamic fluid display apparatus can be referred to corresponding description of the dynamic fluid display method described above, and details thereof will be omitted here.

With the dynamic fluid display apparatus provided in the embodiments of the present disclosure, the background image inputted by the user may be received. The fluid and the background image may be displayed by superimposing the fluid on the background image. When the target object is detected on the user display interface, the change of the parameter of the fluid in the image is controlled based on the attribute information of the target object detected on the user display interface, to display the dynamic fluid, thereby realizing that the fluid drives the background image to move together with the fluid. Such an interaction method is novel and interesting.

Figure 4:
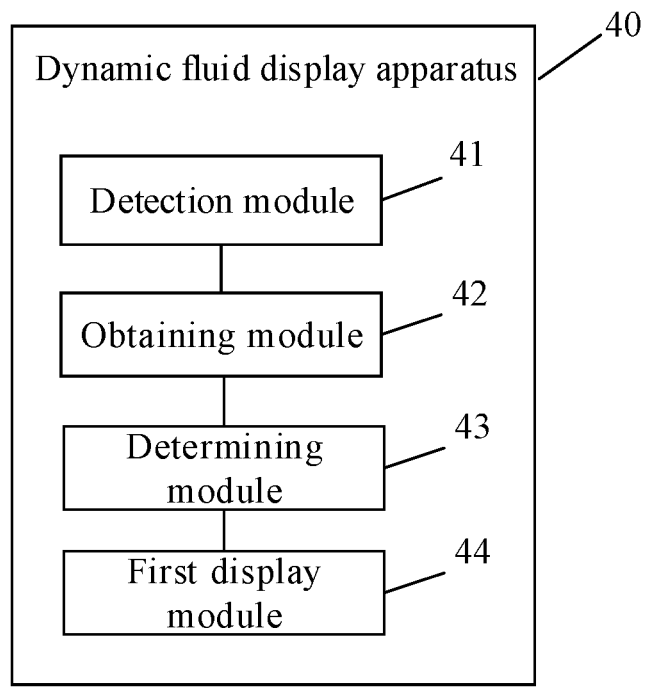
FIG. 4 is a schematic diagram showing a structure of a dynamic fluid display apparatus according to an embodiment of the present disclosure.
Figure 5:
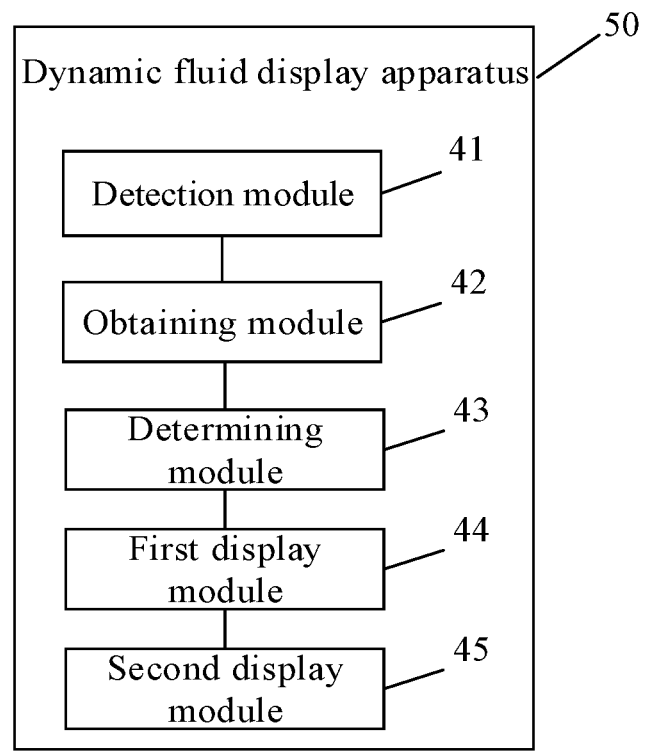
FIG. 5 is a schematic diagram showing a structure of another dynamic fluid display apparatus according to an embodiment of the present disclosure.
Figure 6:
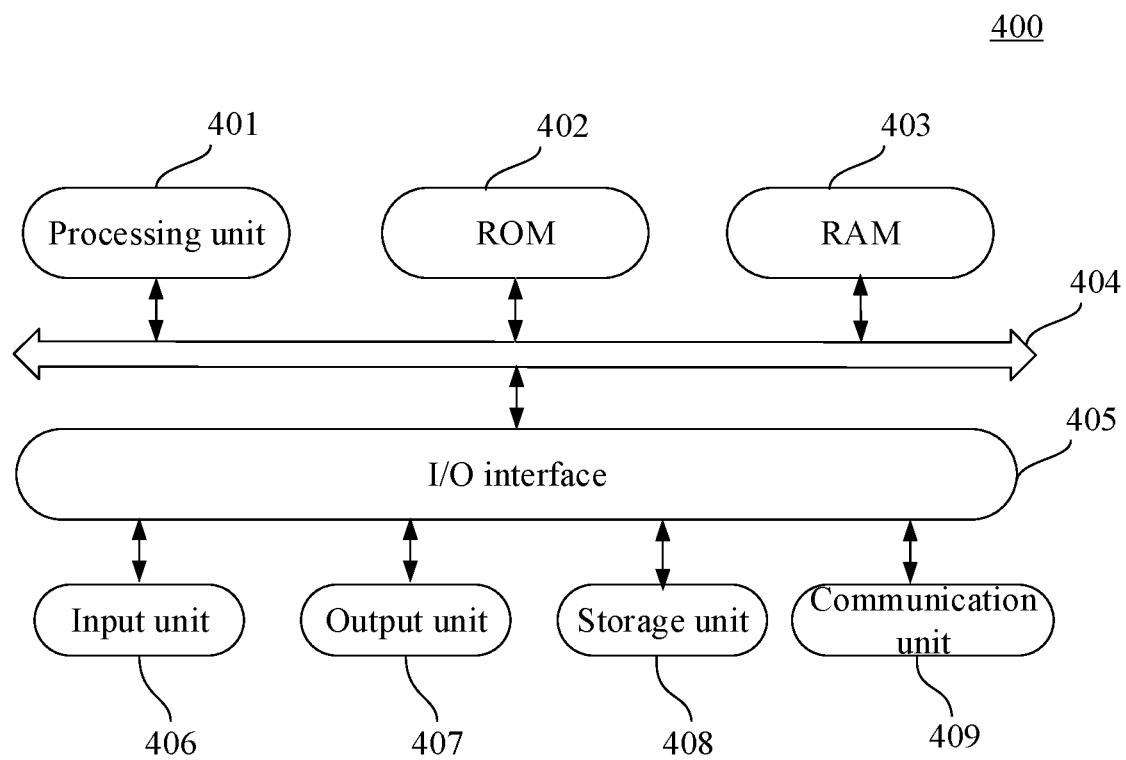
FIG. 6 is a schematic diagram showing a structure of an electronic device according to an embodiment of the present disclosure.

Reference is now made to FIG. 4, which is a schematic diagram showing a structure of an electronic device 400 adapted to implement the embodiments of the present disclosure. An executive subject of the technical solutions of the embodiments of the present disclosure may include, but are not limited to, mobile terminals such as a mobile phone, a laptop computer, a digital broadcast receiver, a PDA, a tablet computer or PAD, a Portable Multimedia Player (PMP), an on-vehicle terminal (e.g., an on-vehicle navigation terminal), a wearable device, etc., and fixed terminals such as a digital TV, a desktop computer, a smart home device, etc. The electronic device illustrated in FIG. 4 is exemplary only, and should not be construed as limiting the function and scope of use of the embodiments of the present disclosure.

The electronic device includes a memory and a processor. Here, the processor may be referred to as a processing unit 401 described below, and the memory may include at least one of a Read Only Memory (ROM) 402, a Random Access Memory (RAM) 403, or a storage unit 408 that are described below. Specific details are described below.

As illustrated in FIG. 4, the electronic device 400 may include a processing unit (such as a central processing unit, a graphics processing unit, etc.) 401, which may execute program codes of the method illustrated in the flowcharts in accordance with programs stored in an ROM 402 or loaded from a storage unit 408 into an RAM 403, to implement the above functions as defined in the method of the embodiments of the present disclosure. In the RAM 403, various programs and data required for operation of the electronic device 400 may also be stored. The processing unit 401, the ROM 402, and the RAM 403 are connected to each other through a bus 404. An Input/Output (I/O) interface 405 is also connected to the bus 404.

Generally, the following units may be connected to the I/O interface 405: an input unit 406 including, for example, a touch screen, a touch pad, a keyboard, a mouse, a camera, a microphone, an accelerometer, a gyroscope, etc.; an output unit 407 including, for example, a Liquid Crystal Display (LCD), a speaker, an oscillator, etc.; the storage unit 408 including, for example, a magnetic tape or a hard disk; and a communication unit 409. The communication unit 409 may allow the electronic device 400 to perform wireless or wired communication with other devices for data exchange. Although FIG. 4 illustrates the electronic device 400 having various units, it can be appreciated that it is not necessary to implement or provide all the illustrated units. Alternatively, more or fewer units may be implemented or provided.

In particular, according to embodiments of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 409, or installed from the storage unit 408, or installed from the ROM 402. When the computer program is executed by the processing unit 401, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer disk, a hard disk, an RAM, an ROM, an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server can communicate using any currently-known or future-developed network protocol, such as HyperText Transfer Protocol (HTTP), and can be in interconnection communication with digital data in any form or medium (e.g., a communication network). Examples of communication networks include a Local Area Network (LAN), a Wide Area Network (WAN), the Internet work (e.g., the Internet), and an end-to-end network (e.g., ad hoc end-to-end network), as well as any currently-known or future-developed network.

The above computer-readable medium may be included in the above electronic device; or may be present independently without being assembled into the electronic device.

The above computer-readable medium may carry one or more programs which, when executed by the electronic device, causes the electronic device to implement the above functions as defined in the method of the embodiments of the present disclosure. For example, the one or more programs, when executed by the electronic device, cause the electronic device to: detect a target object on a user display interface; obtain attribute information of the target object; determine, on the user display interface based on the attribute information of the target object, a change of a parameter of a fluid at each target texture pixel associated with the target object; and display a dynamic fluid on the user display interface based on the change of the parameter of the fluid.

The computer program codes for implementing the operations according to the present disclosure may be written in one or more programming languages or any combination thereof. The programming languages may include but are not limited to object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on a remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Modules or units involved and described in the embodiments of the present disclosure can be implemented in software or hardware. Here, a name of a module or a unit does not constitute a limitation on the module or the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

According to one or more embodiments of the present disclosure, the present disclosure provides a dynamic fluid display method. The method includes: detecting a target object on a user display interface; obtaining attribute information of the target object; determining, on the user display interface based on the attribute information of the target object, a change of a parameter of a fluid at each target texture pixel associated with the target object; and displaying a dynamic fluid on the user display interface based on the change of the parameter of the fluid.

In a possible implementation, the parameter of the fluid includes a speed parameter. The attribute information of the target object includes a speed variation of the target object. Determining, on the user display interface based on the attribute information of the target object, the change of the parameter of the fluid at each target texture pixel associated with the target object includes: determining a change of the speed parameter of the fluid at each target texture pixel based on the speed variation of the target object.

In a possible implementation, the attribute information of the target object further includes initial position information of the target object and an action radius of the target object. Determining the change of the speed parameter of the fluid at each target texture pixel based on the speed variation of the target object includes: obtaining, for each target texture pixel, position information corresponding to the target texture pixel; and determining, for each target texture pixel, a speed of the fluid at the target texture pixel at a next time point, based on the speed variation of the target object, the initial position information of the target object, the action radius of the target object, the position information corresponding to the target texture pixel, and a speed of the fluid at the target texture pixel at a current time point.

In a possible implementation, the parameter of the fluid includes a color parameter. The attribute information of the target object includes a color variation corresponding to the target object. Determining, on the user display interface based on the attribute information of the target object, the change of the parameter of the fluid at each target texture pixel associated with the target object includes: determining a change of the color parameter of the fluid at each target texture pixel based on the color variation corresponding to the target object.

In a possible implementation, the attribute information of the target object further includes initial position information of the target object and an action radius of the target object. Determining the change of the color parameter of the fluid at each target texture pixel based on the color variation corresponding to the target object includes: obtaining, for each target texture pixel, position information corresponding to the target texture pixel; and determining, for each target texture pixel, a color of the fluid at the target texture pixel at a next time point, based on the color variation corresponding to the target object, the initial position information of the target object, the action radius of the target object, the position information corresponding to the target texture pixel, and a color of the fluid at the target texture pixel at a current time point.

In a possible implementation, the attribute information includes a display position of the target object when the target object is stationary. The parameter of the fluid includes a color parameter. Determining, on the user display interface based on the attribute information of the target object, the change of the parameter of the fluid at each target texture pixel associated with the target object includes: determining, on the user display interface based on the display position, a position of each target texture pixel associated with the target object, and adjusting a color of the fluid at each target texture pixel to a predetermined color.

In a possible implementation, when at least two target objects are provided, the attribute information includes respective attribute information of each target object of the at least two target objects. Determining, on the user display interface based on the attribute information of the target object, the change of the parameter of the fluid at each target texture pixel associated with the target object includes: determining, on the user display interface based on the respective attribute information of each target object of the at least two target objects, a change of the parameter of the fluid at each target texture pixel associated with each target object, to display on the user display interface a dynamic fluid corresponding to each target object.

In a possible implementation, the parameter of the fluid includes a speed parameter. The method further includes, for each target texture pixel: obtaining a time stepsize for updating the speed parameter; obtaining the speed parameter of the fluid at the target texture pixel at a current time point; determining a first texture pixel position at the current time point based on the time stepsize, the speed parameter of the fluid at the target texture pixel at the current time point, and a position of the target texture pixel at the current time point; and determining a color at the first texture pixel position at the current time point as a color of the fluid at the target texture pixel at a next time point.

In a possible implementation, the method further includes, for each target texture pixel, in response to detecting no target object in the user display interface: determining a second texture pixel position at the current time point based on the time stepsize, the speed parameter of the fluid at the target texture pixel at the current time point, and the position of the target texture pixel at the current time point; and determining a speed parameter of the fluid at the second texture pixel position at the current time point as a speed parameter of the fluid at the target texture pixel at the next time point.

In a possible implementation, the target object includes a target object in a video or a touch operation object.

In a possible implementation, the target object is the touch operation object. The attribute information of the target object includes a speed variation of the target object. Obtaining the attribute information of the target object includes: detecting a swiping operation speed of the touch operation object on the user display interface at each time point; and determining a speed variation of the touch operation object from a current time point to a next time point based on the swiping operation speed.

In a possible implementation, the target object is the target object in the video. The attribute information of the target object includes a speed variation of the target object. Obtaining the attribute information of the target object includes: obtaining a position of the target object in each frame of image of the video; determining a moving distance of the target object from one frame of image to a next frame of image based on the position of the target object in each frame of image of the video; obtaining a moving time of the target object from the one frame of image to the next frame of image; determining a moving speed of the target object at each time point based on the moving distance and the moving time; and determining a speed variation of the target object from a current time point to a next time point, based on the moving speed of the target object at each time point.

In a possible implementation, the dynamic fluid display method further includes: displaying, on the user display interface in response to an image input operation of a user, an image corresponding to the image input operation, and displaying the fluid and the image by superimposing the fluid on the image. Determining, on the user display interface based on the attribute information of the target object, the change of the parameter of the fluid at each target texture pixel associated with the target object includes: determining, in the image based on the attribute information, the change of the parameter of the fluid at each target texture pixel associated with the target object. Displaying the dynamic fluid on the user display interface based on the change of the parameter of the fluid includes: displaying the dynamic fluid in the image based on the change of the parameter of the fluid at each target texture pixel.

According to one or more embodiments of the present disclosure, the present disclosure provides a dynamic fluid display apparatus. The apparatus includes: a detection module configured to detect a target object on a user display interface; an obtaining module configured to obtain attribute information of the target object; a determining module configured to determine, on the user display interface based on the attribute information of the target object, a change of a parameter of a fluid at each target texture pixel associated with the target object; and a first display module configured to display a dynamic fluid on the user display interface based on the change of the parameter of the fluid.

In a possible implementation, the parameter of the fluid includes a speed parameter. The attribute information of the target object includes a speed variation of the target object. The determining module is configured to: determine a change of the speed parameter of the fluid at each target texture pixel based on the speed variation of the target object.

In a possible implementation, the attribute information of the target object further includes initial position information of the target object and an action radius of the target object. Determining the change of the speed parameter of the fluid at each target texture pixel based on the speed variation of the target object includes: obtaining, for each target texture pixel, position information corresponding to the target texture pixel; and determining, for each target texture pixel, a speed of the fluid at the target texture pixel at a next time point, based on the speed variation of the target object, the initial position information of the target object, the action radius of the target object, the position information corresponding to the target texture pixel, and a speed of the fluid at the target texture pixel at a current time point.

In a possible implementation, the parameter of the fluid includes a color parameter. The attribute information of the target object includes a color variation corresponding to the target object. The determining module is configured to: determine a change of the color parameter of the fluid at each target texture pixel based on the color variation corresponding to the target object.

In a possible implementation, the attribute information of the target object further includes initial position information of the target object and an action radius of the target object. The determining module is configured to, when determining the change of the color parameter of the fluid at each target texture pixel based on the color variation corresponding to the target object: obtain, for each target texture pixel, position information corresponding to the target texture pixel; and determine, for each target texture pixel, a color of the fluid at the target texture pixel at a next time point, based on the color variation corresponding to the target object, the initial position information of the target object, the action radius of the target object, the position information corresponding to the target texture pixel, and a color of the fluid at the target texture pixel at a current time point.

In a possible implementation, the attribute information includes a display position of the target object when the target object is stationary. The parameter of the fluid includes a color parameter. The determining module is configured to: determine, on the user display interface based on the display position, a position of each target texture pixel associated with the target object, and adjust a color of the fluid at each target texture pixel to a predetermined color.

In a possible implementation, when at least two target objects are provided, the attribute information includes respective attribute information of each target object of the at least two target objects. The determining module is configured to: determine, on the user display interface based on the respective attribute information of each target object of the at least two target objects, a change of the parameter of the fluid at each target texture pixel associated with each target object, to display on the user display interface a dynamic fluid corresponding to each target object.

In a possible implementation, the parameter of the fluid includes a speed parameter. The dynamic fluid display apparatus further includes a color update module. The color update module is configured to: obtain a time stepsize for updating the speed parameter; obtain, for each target texture pixel, the speed parameter of the fluid at the target texture pixel at a current time point; determine, for each target texture pixel, a first texture pixel position at the current time point based on the time stepsize, the speed parameter of the fluid at the target texture pixel at the current time point, and a position of the target texture pixel at the current time point; and determine a color at the first texture pixel position at the current time point as a color of the fluid at the target texture pixel at a next time point.

In a possible implementation, in response to detecting no target object in the user display interface, the dynamic fluid display apparatus further includes a speed update module. The speed update module is configured to: determine, for each target texture pixel, a second texture pixel position at the current time point based on the time stepsize, the speed parameter of the fluid at the target texture pixel at the current time point, and the position of the target texture pixel at the current time point; and determine, for each target texture pixel, a speed parameter of the fluid at the second texture pixel position at the current time point as a speed parameter of the fluid at the target texture pixel at the next time point.

In a possible implementation, the target object includes a target object in a video or a touch operation object.

In a possible implementation, the target object is the target object in the video. The attribute information of the target object includes a speed variation of the target object. The obtaining module is configured to: obtain a position of the target object in each frame of image of the video; determine a moving distance of the target object from one frame of image to a next frame of image based on the position of the target object in each frame of image of the video; obtain a moving time of the target object from the one frame of image to the next frame of image; determine a moving speed of the target object at each time point based on the moving distance and the moving time; and determine a speed variation of the target object from a current time point to a next time point, based on the moving speed of the target object at each time point.

In a possible implementation, the target object is the touch operation object. The attribute information of the target object includes a speed variation of the target object. The obtaining module is configured to: detect a swiping operation speed of the touch operation object on the user display interface at each time point; and determine a speed variation of the touch operation object from a current time point to a next time point based on the swiping operation speed.

In a possible implementation, the dynamic fluid display apparatus further includes a second display module. The second display module is configured to: display, on the user display interface in response to an image input operation of a user, an image corresponding to the image input operation, and display the fluid and the image by superimposing the fluid on the image.

Correspondingly, the determining module is configured to: determine, in the image based on the attribute information, the change of the parameter of the fluid at each target texture pixel associated with the target object.

The first display module is configured to: display the dynamic fluid in the image based on the change of the parameter of the fluid at each target texture pixel.

According to one or more embodiments of the present disclosure, the present disclosure provides an electronic device. The electronic device includes: one or more processors; and a memory having one or more applications stored thereon. The one or more applications, when executed by the one or more processors, cause the electronic device to perform the dynamic fluid display method.

According to one or more embodiments of the present disclosure, the present disclosure provides a computer-readable medium. The computer-readable medium is configured to store computer instructions. The computer instructions, when executed by a computer, cause the computer to perform the above-mentioned dynamic fluid display method.

According to one or more embodiments of the present disclosure, the present disclosure provides a computer program product. The computer program product includes computer instructions. The computer instructions, when executed by a computer, implement the above-mentioned dynamic fluid display method.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, but should also encompass other technical solutions formed by any other combinations of features described above or equivalents thereof without departing from the above ideas of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multi-tasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:

1. A dynamic fluid display method, comprising:
    detecting a target object on a user display interface;
    obtaining attribute information of the target object;
    determining, on the user display interface based on the attribute information of the target object, a change of a parameter of a fluid at each target texture pixel associated with the target object; and
    displaying a dynamic fluid on the user display interface based on the change of the parameter of the fluid,
    wherein the parameter of the fluid comprises a speed parameter,
    the attribute information of the target object comprises a speed variation of the target object, and
    said determining, on the user display interface based on the attribute information of the target object, the change of the parameter of the fluid at each target texture pixel associated with the target object comprises:
    determining a change of the speed parameter of the fluid at each target texture pixel based on the speed variation of the target object.

2. The dynamic fluid display method according to claim 1, wherein the attribute information of the target object further comprises initial position information of the target object and an action radius of the target object, and
    said determining the change of the speed parameter of the fluid at each target texture pixel based on the speed variation of the target object comprises:
    obtaining, for each target texture pixel, position information corresponding to the target texture pixel; and
    determining, for each target texture pixel, a speed of the fluid at the target texture pixel at a next time point, based on the speed variation of the target object, the initial position information of the target object, the action radius of the target object, the position information corresponding to the target texture pixel, and a speed of the fluid at the target texture pixel at a current time point.

3. The dynamic fluid display method according to claim 1, wherein the parameter of the fluid comprises a color parameter,
    the attribute information of the target object comprises a color variation corresponding to the target object, wherein a color corresponding to the target object is a predetermined color or a color determined based on a selection instruction entered by a user, the color variation corresponding to the target object is a difference between a color value of a color corresponding to the target object at a current time point and a color value of a color corresponding to the target object at a previous time point, and said determining, on the user display interface based on the attribute information of the target object, the change of the parameter of the fluid at each target texture pixel associated with the target object comprises:

determining a change of the color parameter of the fluid at each target texture pixel based on the color variation corresponding to the target object.

4. The dynamic fluid display method according to claim 3, wherein the attribute information of the target object further comprises initial position information of the target object and an action radius of the target object, and said determining the change of the color parameter of the fluid at each target texture pixel based on the color variation corresponding to the target object comprises:

obtaining, for each target texture pixel, position information corresponding to the target texture pixel; and determining, for each target texture pixel, a color of the fluid at the target texture pixel at a next time point, based on the color variation corresponding to the target object, the initial position information of the target object, the action radius of the target object, the position information corresponding to the target texture pixel, and a color of the fluid at the target texture pixel at the current time point.

5. The dynamic fluid display method according to claim 1, wherein the attribute information comprises a display position of the target object when the target object is stationary, the parameter of the fluid comprises a color parameter, and said determining, on the user display interface based on the attribute information of the target object, the change of the parameter of the fluid at each target texture pixel associated with the target object comprises:

determining, on the user display interface based on the display position, a position of each target texture pixel associated with the target object, and adjusting a color of the fluid at each target texture pixel to a predetermined color.

6. The dynamic fluid display method according to claim 1, wherein when at least two target objects are provided, the attribute information comprises respective attribute information of each target object of the at least two target objects, and said determining, on the user display interface based on the attribute information of the target object, the change of the parameter of the fluid at each target texture pixel associated with the target object comprises:

determining, on the user display interface based on the respective attribute information of each target object of the at least two target objects, a change of the parameter of the fluid at each target texture pixel associated with each target object, to display on the user display interface a dynamic fluid corresponding to each target object.

7. The dynamic fluid display method according to claim 1, wherein the parameter of the fluid comprises a speed parameter, and the method further comprises, for each target texture pixel:

obtaining a time stepsize for updating the speed parameter;

obtaining the speed parameter of the fluid at the target texture pixel at a current time point;

determining a first texture pixel position at the current time point based on the time stepsize, the speed parameter of the fluid at the target texture pixel at the current time point, and a position of the target texture pixel at the current time point; and determining a color at the first texture pixel position at the current time point as a color of the fluid at the target texture pixel at a next time point.

8. The dynamic fluid display method according to claim 7, further comprising, for each target texture pixel, in response to detecting no target object in the user display interface:

determining a second texture pixel position at the current time point based on the time stepsize, the speed parameter of the fluid at the target texture pixel at the current time point, and the position of the target texture pixel at the current time point; and determining a speed parameter of the fluid at the second texture pixel position at the current time point as a speed parameter of the fluid at the target texture pixel at the next time point.

9. The dynamic fluid display method according to claim 1, wherein the target object comprises a target object in a video or a touch operation object.

10. The dynamic fluid display method according to claim 9, wherein the target object is the touch operation object, the attribute information of the target object comprises a speed variation of the target object, and said obtaining the attribute information of the target object comprises:

detecting a swiping operation speed of the touch operation object on the user display interface at each time point; and determining a speed variation of the touch operation object from a current time point to a next time point based on the swiping operation speed.

11. The dynamic fluid display method according to claim 9, wherein the target object is the target object in the video, the attribute information of the target object comprises a speed variation of the target object, and said obtaining the attribute information of the target object comprises:

obtaining a position of the target object in each frame of image of the video;

determining a moving distance of the target object from one frame of image to a next frame of image based on the position of the target object in each frame of image of the video;

obtaining a moving time of the target object from the one frame of image to the next frame of image;

determining a moving speed of the target object at each time point based on the moving distance and the moving time; and determining a speed variation of the target object from a current time point to a next time point, based on the moving speed of the target object at each time point.

12. The dynamic fluid display method according to claim 1, further comprising: displaying, on the user display interface in response to an image input operation of a user, an image corresponding to the image input operation as a background image, and displaying the fluid and the background image by superimposing the fluid on the background image, wherein said determining, on the user display interface based on the attribute information of the target object, the change of the parameter of the fluid at each target texture pixel associated with the target object comprises: determining, in the background image based on the attribute information, the change of the parameter of the fluid at each target texture pixel associated with the target object; and said displaying the dynamic fluid on the user display interface based on the change of the parameter of the fluid comprises: displaying the dynamic fluid in the background image based on the change of the parameter of the fluid at each target texture pixel.

13. A non-volatile computer-readable medium, having computer instructions stored thereon, wherein the computer instructions, when executed by a computer, cause the computer to perform the dynamic fluid display method according to claim 1.

14. An electronic device, comprising:
one or more processors; and
a memory having one or more applications stored thereon, wherein the one or more applications, when executed by the one or more processors, cause the electronic device to perform a dynamic fluid display method, the dynamic fluid display method comprising:
detecting a target object on a user display interface;
obtaining attribute information of the target object;
determining, on the user display interface based on the attribute information of the target object, a change of a parameter of a fluid at each target texture pixel associated with the target object; and
displaying a dynamic fluid on the user display interface based on the change of the parameter of the fluid,
wherein the parameter of the fluid comprises a speed parameter,
the attribute information of the target object comprises a speed variation of the target object, and
said determining, on the user display interface based on the attribute information of the target object, the change of the parameter of the fluid at each target texture pixel associated with the target object comprises:
determining a change of the speed parameter of the fluid at each target texture pixel based on the speed variation of the target object.

15. The electronic device according to claim 14, wherein the parameter of the fluid comprises a color parameter,
the attribute information of the target object comprises a color variation corresponding to the target object, wherein a color corresponding to the target object is a predetermined color or a color determined based on a selection instruction entered by a user, the color variation corresponding to the target object is a difference between a color value of a color corresponding to the target object at a current time point and a color value of a color corresponding to the target object at a previous time point, and said determining, on the user display interface based on the attribute information of the target object, the change of the parameter of the fluid at each target texture pixel associated with the target object comprises:
determining a change of the color parameter of the fluid at each target texture pixel based on the color variation corresponding to the target object.

16. The electronic device according to claim 14, further comprising, for each target texture pixel, in response to detecting no target object in the user display interface:
determining a second texture pixel position at the current time point based on the time stepsize, the speed parameter of the fluid at the target texture pixel at the current time point, and the position of the target texture pixel at the current time point; and
determining a speed parameter of the fluid at the second texture pixel position at the current time point as a speed parameter of the fluid at the target texture pixel at the next time point.

17. The electronic device according to claim 14, wherein the target object is the touch operation object,
the attribute information of the target object comprises a speed variation of the target object, and
said obtaining the attribute information of the target object comprises:
detecting a swiping operation speed of the touch operation object on the user display interface at each time point; and
determining a speed variation of the touch operation object from a current time point to a next time point based on the swiping operation speed.

18. The electronic device according to claim 14, wherein the target object is the target object in the video,
the attribute information of the target object comprises a speed variation of the target object, and
said obtaining the attribute information of the target object comprises:
obtaining a position of the target object in each frame of image of the video;
determining a moving distance of the target object from one frame of image to a next frame of image based on the position of the target object in each frame of image of the video;
obtaining a moving time of the target object from the one frame of image to the next frame of image;
determining a moving speed of the target object at each time point based on the moving distance and the moving time; and
determining a speed variation of the target object from a current time point to a next time point, based on the moving speed of the target object at each time point.

* * * * *